United States Patent Office 3,488,374
Patented Jan. 6, 1970

3,488,374
PREPARATION OF POLYISOCYANATE
COMPOSITIONS
Ehrenfried H. Kober, Hamden, George Rozsa, New
Haven, and Wilhelm J. Schnabel, Branford, Conn., assignors to Olin Mathieson Chemical Corporation, a corporation of Virginia
No Drawing. Filed Oct. 4, 1965, Ser. No. 492,865
Int. Cl. C07c *119/04;* C08g *22/04*
U.S. Cl. 260—453                                   4 Claims

ABSTRACT OF THE DISCLOSURE

Mixtures of polyisocyanates are prepared by reacting phosgene with a stable solution of a polyamine in an inert solvent. The stable solutions are made by adding the polyamines as a solution in tolylene diamine to the inert solvent. Reaction of the polyisocyanate mixtures with polyols yields valuable rigid polyurethane foams.

---

This invention relates to a process for preparing mixtures of isocyanates prepared by reacting a mixture of polyamines of the formula:

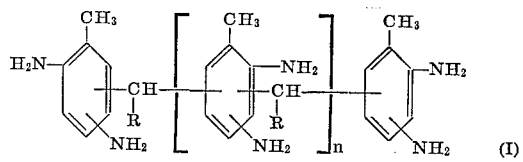

wherein n is an integer of from 0 to about 10 and R is hydrogen or alkyl of from 1 to 5 carbon atoms inclusive, with phosgene.

The polyamines useful as starting materials in the process of this invention can be prepared by the process described in Kober, Rozsa and Schnabel application for Composition and Method, Ser. No. 387,806, filed Aug. 5, 1964, now abandoned. By the process of Kober, Rozsa and Schnabel a mixture of polyamines suitable as a starting material in the process of this invention can be prepared by reacting an aldehyde of the formula:

wherein R is hydrogen or an alkyl group of from 1 to 5 carbon atoms, with a mixture of 2,4-tolylene diamine and 2,6-tolylene diamine, in the presence of a mineral acid, the quantity of the mineral acid employed being not less than 1 acid equivalent per mole of tolylene diamine charged to the reactor and the amount of the aldehyde employed being from about 0.5 to about 0.75 mole per mole of tolylene diamine. For example, a suitable mixed polyamine starting material can be prepared by reacting 5.0 moles of a mixture containing technical tolylene diamine in 1.1 liter of water and in the presence of 425 ml. (about 5.0 moles) of a concentrated mineral acid such as hydrochloric acid, with 2.5 moles of formaldehyde at a temperature of 60°–70° C. for about 4 hours. Neutralization of the resulting reaction mixture with aqueous sodium hydroxide yields the mixed polymethylene-polytolylenediamine product.

An especially useful starting material for preparing the mixed polyamines employed in the process of this invention is technical tolylene diamine which has the following composition:

| Component: | Percent by weight |
|---|---|
| Tolylene diamine | |
| 2,4-isomer ⎱ | ¹94.0 |
| 2,6-isomer ⎰ | |
| 2,3-isomer ⎫ | |
| 2,5-isomer ⎬ | 4.0 |
| 3,4-isomer ⎭ | |
| Total reducibles (nitro groups) | 0.1 |
| Moisture | 0.1 |
| Tars | Balance |

¹ The weight ratio of the 2,4- to 2,6-isomer is about 80/20.

Polyfunctional isocyanates having more than two isocyanate groups in the molecule offer advantages in many areas of urethane technology, especially where high rigidity, a considerable degree of toughness and high heat distortion points are desired for the polyurethane foams. Isocyanates, obtained by the phosgenation of products resulting from the condensation of aniline with formaldehyde in acidic medium have been employed in the manufacture of rigid foams in attempts to prepare products having the above-stated properties. Since some of the properties of foams, for example, rigidity are related directly to the functionality of the polyisocyanate, there is need in the art for polyisocyanates of a higher functionality.

The preparation of polyisocyanates having at least four isocyanate groups per molecule which can be produced from low priced commercially available raw materials, is one of the objects of this invention.

Polyamines useful as starting materials in the process of this invention have the formula:

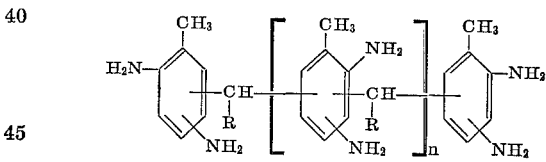

wherein n is an integer of from 0 to about 10 and R is a hydrogen or alkyl of from 1 to 5 carbon atoms. The actual starting materials are mixtures of polyamines having the above structure. The conversion of these mixed polyamines to the corresponding polyisocyanates has been achieved as described in Kober, Rozsa and Schnabel application Ser. No. 387,806 in which, in the first stage, phosgene is reacted with the mixed polyamine (i.e., the mixed polymethylene-polytolylene-diamine) slurried in an inert solvent at a temperature of from about −10° C. to about +50° C. to form an intermediate product which is then reacted with additional phosgene at a temperature of from about 100° to about 270° C. to yield the corresponding mixed polyisocyanate. For commercial production, the application of a more efficient one-step phosgenation technique, which can be easily adapted to a continuous operation, offers certain advantages.

Hot phosgenation as described by Irwin in U.S. 2,683,160 comprises the reaction of phosgene with an amine in an inert solvent at temperatures in the range of 130 to 300° C. Isolation of the isocyanate formed by this technique usually comprises purging the reaction mixture with nitrogen to remove hydrogen chloride and excess phosgene, removal of the solvent and isolation of the isocyanate by distillation. The known versions of the hot phosgenation technique are performed in a solvent in which the amine is soluble. Since mixtures of amines of structure I are practically insoluble in commercially available inert solvents, e.g. in solvents such as monochlorobenzene, dichlorobenzene, benzene, toluene, xylene, n-butyl acetate, etc., the known techniques cannot be applied for the phosgenation of mixtures of amines of structure I.

Surprisingly, it has been found that stable solutions with a high content (up to 7–8 percent based on the total weight of the solution) of these polyamines in inert solvents such as monochlorobenzene can be prepared if the polyamines are added as a solution in tolylene diamine to the inert solvent. These solutions can be prepared, for example, by dissolving the solution of the polyamines in tolylene diamine, in the inert solvents by agitation and gentle heating. The prepared solutions, which may consist of mixtures of the polyamines and tolylene diamines in various ratios, can be employed as suitable feed solutions for the production of polyisocyanates. The resulting isocyanates consist of mixtures of polyisocyanates and tolylene diisocyanates in a ratio corresponding to the original mixture of polyamines and tolylene diamines.

The phosgenation reaction is carried out at a temperature ranging from 100 to 200° C. but preferably at about the reflux temperature of the inert solvent used. Phosgene and the solution of amines are fed simultaneously into the reactor. The rate of introduction of phosgene into the reactor is at a rate such that an excess of phosgene is maintained at all times during the reaction. Generally from about 1.5 to about 5.0 moles of phosgene per gram equivalent of —$NH_2$ group is employed, the preferred ratio being from about 2 to 3 moles of phosgene per —$NH_2$ group. The amine mixture is usually fed at a rate ranging from about 0.1 to about 10 grams per minute per liter of reactor space while the preferred feed rate for the mixture is from about 1.5 to 3.0 grams per minute per liter of reactor space.

After purging with an inert gas, such as nitrogen, carbon dioxide, etc., at the reflux temperature of the solvent to remove excess phosgene and hydrochloride, and after removal of the inert solvent by distillation in vacuo, the mixtures of polyisocyanates, thus obtained, may be employed directly for polyurethane formulations. The average isocyanate functionality can be varied and adjusted to specific application requirements by either charging appropriate ratios of polyamines and tolylene diamines ranging from 1:1 to 1:20, but preferably 1:3 to 1:10 by weight in the original feeding solution or by separating part or all of the prepared tolylene diisocyanates from polyisocyanates in the reaction mixture by vacuum distillation. In the latter fashion, two different isocyanate products are obtained which can be utilized for different commercial applications. To obtain diisocyanate/polyisocyanate mixture from which rigid foams of desired properties can be produced, the ratio of tolylene diisocyanates to polyisocyanates is adjusted to about 1:2 to 5:1, and preferably to about 1:1 to 1:3 by weight.

A wide variety of inert solvents can be utilized in this process. Any solvent inert to the reactants and the isocyanate product, which is a good solvent for the reactants and the product, can be utilized. Useful inert solvents include for example, monochlorobenzene, ortho-dichlorobenzene, p-dichlorobenzene, the trichloroben- zenes, chlorinated toluenes, chlorinated xylenes, chloroethylbenzene, beta-napthyl chloride, benzene, toluene, xylene, chlorinated biphenyls, etc.

Example I 610 grams (5.0 moles) of technical grade tolylene diamine was dissolved under a blanket of nitrogen in a mixture of 1.1 liter of water and 45 ml. (approximately 5.0 moles) of concentrated hydrochloric acid. Aqueous formaldehyde (400 ml. of solution containing 2.5 moles of formaldehyde) was added at 60–70° C. within one hour to the agitated amine salt solution. The mixture was stirred for three hours at 65–70° C., cooled to room temperature and then gradually added with agitation to a mixture of 1.0 liter of concentrated ammonium hydroxide approximately 58 percent ammonium hydroxide) and 4.0 liters of water. The formed precipitate was isolated by filtration, washed with water, and dried in vacuo, first at room temperature and finally at 60° C. The dry polymethylenepolytolyldiamine product 522 grams (85.6 weight percent yield based on the amount of diamine mixture charged), had an amino group content of 22 percent according to potentiometric titration with perchloric acid in acetic acid. The average molecular weight, was 395, which corresponds to an average —$NH_2$ functionality of 5.4.

A total of 75 grams of polymethylene-polytolyldiamine prepared as described above was added to 225 grams of melted technical toluene diamine. The mixture of 300 grams of amines was stirred for 15 min. at 100–105° C. and 700 g. of preheated monochlorobenzene (approximately 100° C.) were added slowly and under constant agitation yielding a clear solution, containing a total of 30 percent by weight of dissolved amines (including 7.5 percent by weight of polymethylene-polytolyldiamine). The solution—maintained in a storage flask at 80–100° C. was pumped within approximately three and one half hours into a phosgenation reactor containing 1500 ml. of monochlorobenzene. During this time phosgene was passed into the reaction solution at a rate of approximately 5.0 grams per minute, which corresponds to a $COCl_2$:$NH_2$ ratio in the feed streams of 2:1. During the reaction the temperature in the reactor was kept at 120°–130° C. After completion of the phosgenation, the reaction mixture was purged with nitrogen at 125° C. for 45 minutes to remove unreacted phosgene and hydrogen chloride. Small amounts of solids (less than 2.0 grams) were removed by filtration. The solvent was distilled off by vacuum distillation yielding 400 grams of polyisocyanate mixture, which was liquid at 50° C. The average isocyanate equivalent weight was 113 according to —NCO group determination. This corresponds to an approximately 78 percent conversion of total amino groups, contained in the charged polyamine mixture, to —NCO groups.

Example II

To 300 grams of the same mixture of polymethylene-polytolyldiamine product and tolylene diamine utilized in Example I, 700 grams of preheated o-dichlorobenzene was added and the resulting solution was phosgenated in the same manner as described in Example I. The temperature in the reactor was maintained at 160–170° C. A total of 445 grams of polyisocyanate mixture, which was liquid at room temperature, was obtained. The average isocyanate equivalent weight was 118.7 according to —NCO group determination. This corresponds to an approximately 83 percent conversion of —$NH_2$ groups to —NCO groups.

Example III

A total of 25 grams of polymethylene-polytoyldiamine, which was prepared by reaction of technical tolylene diamine with formaldehyde in a mole ratio of 2:1.3 according to the procedure described in Example I above were mixed with 225 grams of melted technical tolylene diamine. 583 g. of o-dichlorobenzene were added and the resulting solution, containing a total of 30 percent by weight of amines dissolved was phosgenated in the same manner, as described in Example I, at a reactor temperature of 160–170° C. A total of 340 grams of polyisocyanate mixture, which was liquid at room temperature, was obtained. The average isocyanate equivalent weight (amine equivalent of the product) was 116.5 based on —NCO group determination. This value corresponds to an approximately 75 percent conversion of —NH$_2$ groups to —NCO groups.

Example IV

Polymethylene-polytolyldiamine in the amount of 50 grams, which was prepared by reaction of technical tolylene diamine with formaldehyde in a mole ratio of 2:1.3 according to the procedure described in Example I was mixed with 250 grams of melted technical tolylene diamine following which 700 grams of o-dichlorobenzene were added. The resulting solution, containing a total of 30 percent by weight of dissolved amines was phosgenated in the same manner as described in Example I at a reactor temperature of 160–170° C. A total of 397 grams of polyisocyanate mixture, which was liquid at room temperature, was obtained. The average isocyanate equivalent weight (amine equivalent of the product) was 115 according to —NCO group determination. This value corresponds to an approximately 75 percent conversion of —NH$_2$ to —NCO.

In another embodiment of this invention it has been found that the polymethylene-polytolyldiamines, which are insoluble in the usually employed phosgenation solvents such as monochlorobenzene, ortho-dichlorobenzene, etc., can be phosgenated in a convenient manner while in the form of a suspension or emulsion in the solvent. Generally, the suspension will contain from about 4 to about 20 percent by weight of the starting polymethylene-polytolyldiamine. In this embodiment the temperature of the phosgenation will generally range from about 100 to 200° C. but preferably the reflux temperature of the solvent is employed. In conducting the reaction, usually from about 1.5 to 5.0 moles of phosgene per gram equivalent of —NH$_2$ group is employed, the preferred ratio being from about 2 to 3 moles of phosgene per —NH$_2$ group.

Example V 488 (4.0 moles) of technical grade tolylene diamine were dissolved under a blanket of nitrogen in a mixture of 840 ml. of water and 435 ml. (approximately 5.2 moles) of hydrochloric acid. Aqueous formaldehyde (420 ml. containing 2.6 moles of formaldehyde) was added at 60–70° C. within one hour to the agitated amine salt solution. The mixture was stirred for three hours at 65–70° C., cooled to room temperature and then gradually added with agitation to a solution of 232 g. of sodium hydroxide in 600 ml. of water at a temperature not exceeding 25° C. The thus-formed precipitate was recovered by filtration, washed with water, dried in vacuum first at room temperature and finally at 60° C. The dry polymethylene-polytolyldiamine product, which weighed 565 g. had an amino group content of 19.5 percent according to potentiometric titration with perchloric acid in acetic acid. The yield of the polymethylene-polytolyldiamine product was 89 percent based on the weight of the diamine mixture charged. The average molecular weight of the product (M.P. 120–140° C.) was 416 which corresponds to an average —NH$_2$ functionality of 5.1.

A total of 231 grams of polymethylene-polytolyldiamine, prepared as described above in pulverized form, was suspended in 1230 ml. of o-dichlorobenzene at room temperature. The feeding mixture, agitated by a stream of nitrogen to maintain a homogeneous slurry, was pumped within approximately four hours into a phosgenation reactor containing 1000 ml. of o-dichlorobenzene. During this time phosgene was passed into the reaction solution at a rate corresponding to a COCl$_2$:NH$_2$ mole ratio of 4:1 during which time the temperature in the reactor was maintained at 150–160° C. After completion of the phosgenation, the reaction mixture was purged with nitrogen at 160° C. for one hour to remove unreacted phosgene and hydrogen chloride. Titration with di-n-butylamine indicated a 90 percent conversion of total —NH$_2$ groups charged to —NCO groups. After removal of the solvent by vacuum distillation, a total of 295.0 grams of polyisocyanate product with an —NCO group content of 35.3 percent (corresponding to a yield of 87 percent) was obtained. The wax-like product was miscible with tolylene diisocyanate in all ratios. A mixture of the polyisocyanate product with tolylene diisocyanate in a weight ratio of 2:1 exhibited a viscosity of 1600 cp. at room temperature.

Example VI

A continuous phosgenation was performed by withdrawing the reaction mixture from the reactor through an outlet at the same rate at which the feeding mixture was pumped in. A total of 450 grams of polymethylene-polytolyldiamine, prepared according to the procedure described in Example V and a total of 7500 ml. of dichlorobenzene were charged to the reactor. The temperature in the reactor was maintained at 150–160° C. and a working volume of approximately 2500–2600 ml. was maintained in the reactor during the reaction period. The slurry feed agitated by a stream of nitrogen, was pumped into the reactor at a rate of 9–10 grams per minute and phosgene was simultaneously introduced at a constant rate corresponding to a COCl$_2$:NH$_2$ molar ratio of 4:1. No solids were formed during these cycles of operation. Analysis and work up of stream samples indicated complete conversion of the —NH$_2$ groups to —NCO groups. The final reaction mixture was first purged with nitrogen at 160° C. for one hour to remove unreacted phosgene and hydrogen chloride and then the solvent was distilled off by vacuum distillation. A total of 642.0 grams of polyisocyanate product was obtained. The —NCO group content was 38.8 percent as determined by titration with di-n-butyl amine which corresponds to an approximately quantitative yield based on the conversion of —NH$_2$ groups to —NCO groups. A mixture of the polyisocyanate with tolylene diisocyanate in a weight ratio of 1:1 exhibited a viscosity of 200 cp. at room temperature.

What is claimed is:

1. A method for preparing a mixture of polyisocyanates which comprises reacting phosgene with a mixture of polyamines of the formula:

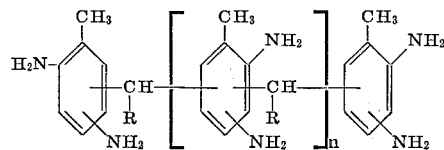

wherein $n$ is an integer of from 0 to about 10 and R is selected from the group consisting of hydrogen and alkyl of from 1 to 5 inclusive carbon atoms, and tolylene diamine in solution in an inert organic solvent at a temperature of from about 100 to 200° C. to form the corresponding polyisocyanate reaction product and recovering the polyisocyanate product formed, the amount of phosgene employed being at least 50 percent in excess of the theoretical amount required to convert each —NH$_2$ group in the starting polyamines into an —NCO group, the said solution containing up to about 8 percent by weight of the said polyamine and in the said solution the weight ratio of polyamines to tolylene diamine being from about 1:1 to 20:1.

2. The method of claim 1 wherein the said solution is formed by admixing with the inert organic solvent a solution of the mixture of polyamines in tolylene diamine.

3. The method of claim 1 wherein R is hydrogen.

4. The method of claim 1 wherein the said inert solvent is o-dichlorobenzene.

References Cited

UNITED STATES PATENTS

| | | | |
|---|---|---|---|
| 2,683,160 | 7/1954 | Irwin | 260—453 |
| 3,277,139 | 10/1966 | Powers | 260—453 |
| 3,294,713 | 12/1966 | Hudson | 260—453 XR |

CHARLES B. PARKER, Primary Examiner

DOLPH H. TORRENCE, Assistant Examiner

U.S. Cl. X.R.

252—182; 260—2.5, 77.5, 570